No. 664,991.　　　　　　　　　　　　　　　Patented Jan. 1, 1901.
F. G. CASWELL.
COMBINED BUREAU AND WASHSTAND.
(Application filed Aug. 14, 1899.)

(No Model.)　　　　　　　　　　　　　　　2 Sheets—Sheet 1.

Witnesses

Inventor
F. G. Caswell,
by O'Meara & Co.
Attorneys

No. 664,991. Patented Jan. 1, 1901.
F. G. CASWELL.
COMBINED BUREAU AND WASHSTAND.
(Application filed Aug. 14, 1899.)
(No Model.) 2 Sheets—Sheet 2.
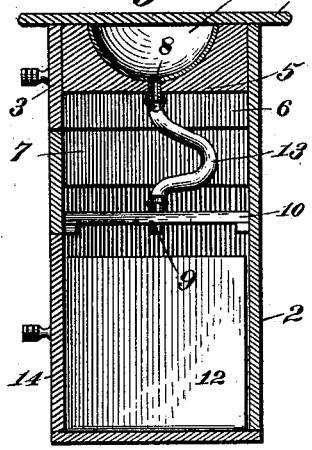
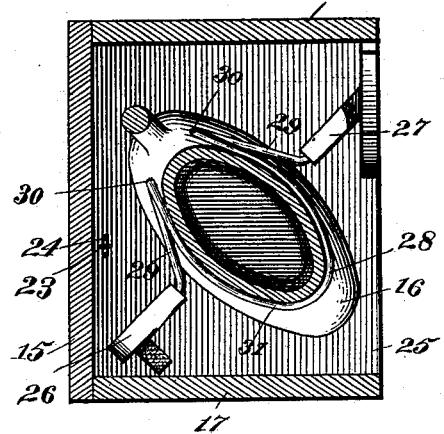
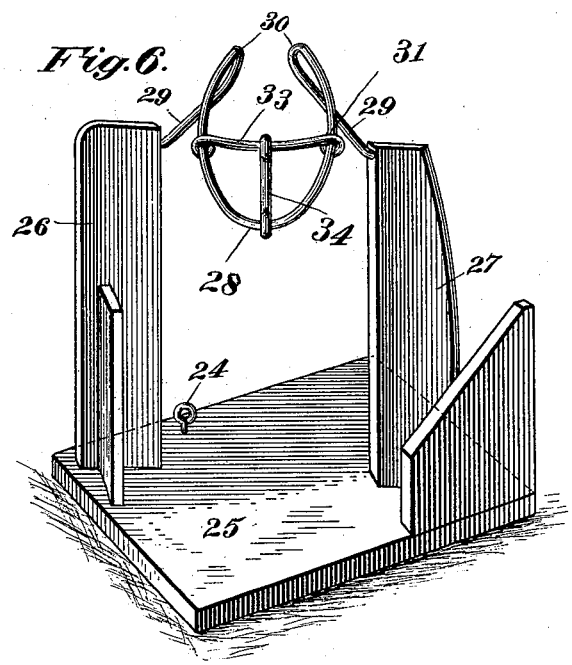
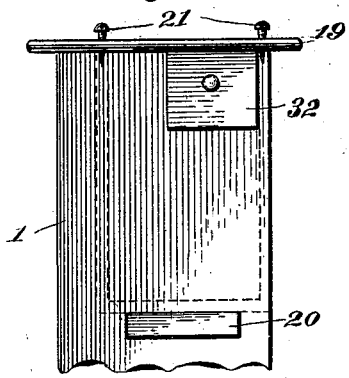
Witnesses
Inventor
F. G. Caswell,
Attorneys

UNITED STATES PATENT OFFICE.

FRANK G. CASWELL, OF HARRISON, MAINE.

COMBINED BUREAU AND WASHSTAND.

SPECIFICATION forming part of Letters Patent No. 664,991, dated January 1, 1901.

Application filed August 14, 1899. Serial No. 727,193. (No model.)

*To all whom it may concern:*

Be it known that I, FRANK G. CASWELL, a citizen of the United States, residing at Harrison, in the county of Cumberland and State of Maine, have invented a new and useful Combined Bureau and Washstand, of which the following is a specification.

My invention relates to household furniture, and particularly to chamber or bed-room furniture, the object of the invention being to economize in space and cost by providing a single article of furniture of improved construction whereby it will perform all the functions and answer all the purposes of a bureau and a washstand.

With this object in view my invention consists in the improved construction, arrangement, and combination of parts hereinafter fully described and afterward specifically pointed out in the appended claims.

In order to enable others skilled in the art to which my invention most nearly appertains to make and use the same, I will now proceed to describe its construction and operation, reference being had to the accompanying drawings, forming part hereof, in which—

Figure 1:
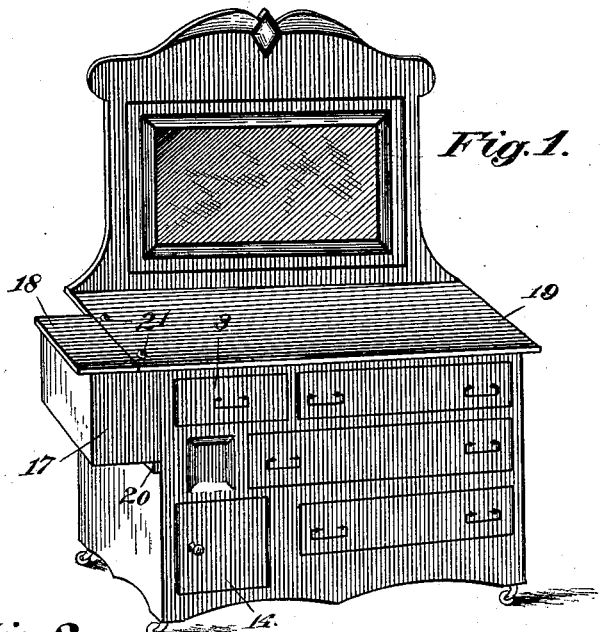
Figure 2:
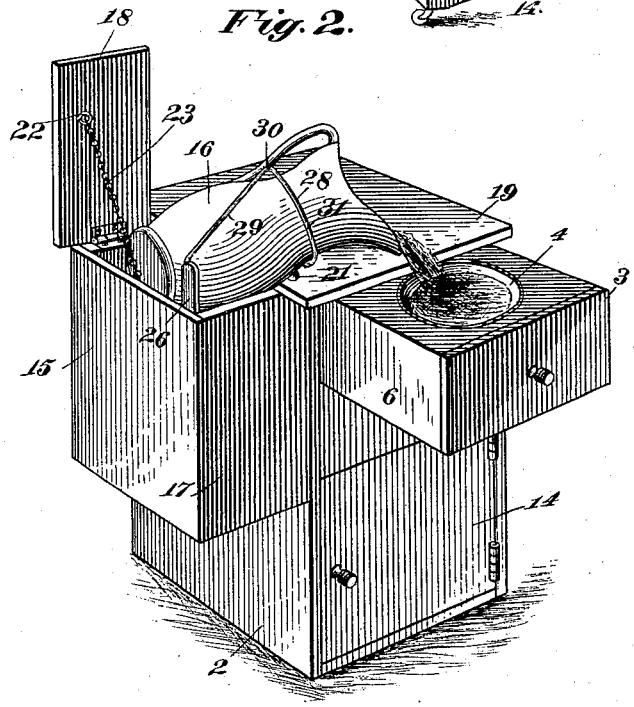
Figure 3:
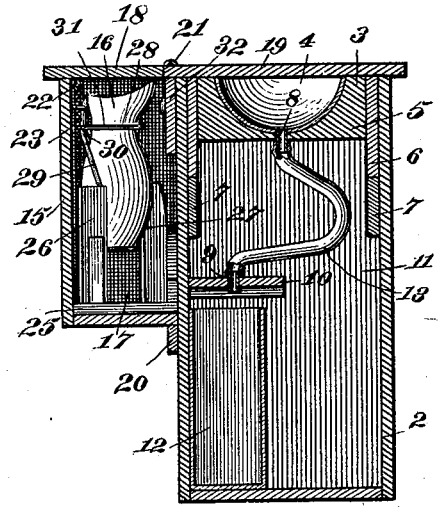

Figure 1 is a perspective view of a combined bureau and washstand constructed in accordance with my invention. Fig. 2 is a perspective view of the washstand portion made separate from the bureau, with the pitcher raised as in the act of pouring water therefrom into the basin. Fig. 3 is a transverse vertical sectional view with the pitcher and basin closed in. Fig. 4 is a vertical sectional view on a plane cutting through from front to rear or at right angles to that of Fig. 3. Fig. 5 is a horizontal sectional view through the pitcher and its containing-box. Fig. 6 is a detail perspective view of the interior mechanism of the pitcher-containing box removed therefrom, an additional pitcher-support being shown. Fig. 7 is a detail view of the side of the box or bureau to which the pitcher-box is attached broken away at the lower end.

Like numerals of reference indicate the same parts wherever they occur in the several figures of the drawings.

Referring to the drawings by numerals, 1 indicates a bureau, Figs. 1 and 7, and 2 a box, Figs. 2 to 5, to which my improved washstand is connected and with which it is combined. In either instance there is provided a drawer 3, in which is placed or formed a washstand 4, the bottom 5 of the drawer being above the lower edges of the sides 6 thereof and the latter slidably resting upon cleats 7 7.

A nozzle 8 projects from the bottom of the washbowl 4 through the bottom 5 of the drawer 3, and a similar nozzle 9 is secured in a shelf 10 in a closet 11 immediately above a waste-water tank or receptacle 12, removably placed in said closet. The two nozzles are connected by a flexible hose or tubing 13, and the closet is provided with a suitable door 14.

15 indicates a box for containing a water-pitcher 16, the sides 17 of said box projecting or overhanging edge 19 of the top of the bureau 1 or box 2 and rest upon a cleat 20, secured to the end of the box or bureau. Screws or nails 21, passing through the top of the box or bureau into the sides 17, serve to secure the pitcher-box in position.

The top 18 is hinged at its rear and has an eye or staple 22 on its under face, in which is connected one end of a chain 23, the other (the lower end of the chain) being connected to an eye or staple 24 in the upper face of a movable board 25 in the pitcher-box. Diagonally-placed uprights 26 27 are secured to said board 25, and a spring-wire clamp 28 connects said uprights at the proper height to engage around the neck of the pitcher. This clamp comprises straight ends 29, projecting inwardly in line with each other from the uprights, rearward and upward bends 30, and a bow 31, passing forward from the rear bends 30 around the front of the pitcher-neck, the rear side of the bow being open to permit the pitcher to be pressed or sprung into it and the straight ends 29 being pivotally fixed in the uprights. The straight ends 29 are located to the rear of the center of the bow 31, so that when the pitcher is placed within the wire support its center of gravity will be in front of the straight ends 29, and the tendency of the pitcher will be for its top or spout to swing forward and the bottom to swing backward relatively to the pivotal points 29, upon which it is suspended. So long as the platform is in its depressed position the nose of the pitcher will rest against the side of the box or article to which the receptacle is secured; but as soon as the lid is raised and the platform is moved upward sufficiently to bring the nose of the pitcher above the top of the receptacle the pitcher will begin to tip forward and will continue to do so until the desired quantity of water has been poured into the washbowl. When that has been accomplised, the platform is lowered by the closing of the lid. As the platform is lowered the nose of the pitcher will be gradually forced back, which will cause the pitcher to assume its vertical position ready for a repetition of the act. In this manner by suspending the pitcher-support eccentrically relatively to its bearings the action and operation of the pitcher become entirely automatic simply by opening and closing the cover of the receptacle in which the pitcher is supported.

The side of the pitcher-box next to the box 2 of the bureau 1 is open, and to prevent the mouth of the pitcher from catching under the overhang of the top of the box or bureau when raised a block 32 is secured to the side of the box or bureau under or flush with the outer edge of the overhang, as best seen in Figs. 3 and 7. In Fig. 6 I show an additional support for the pitcher, consisting of a wire bail 33, secured to each side of the bow 31, and a wire 34, secured to the middle of the bow 31 and the middle of the bail 33, forming, with the bow, a cage to more securely support the pitcher when tilted forward.

By means of this construction I provide a complete combined bureau and washstand in a single article of furniture costing very little more than a bureau alone and occupying a very small space, thus economizing in first cost and also in room, the latter being extremely important in crowded cities, where the rooms of dwellings or hotels must be made as small as possible, owing to the high and continually-increasing price of ground.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. In a washstand, the combination, with a receptacle, of a vertically-movable platform therein, standards on the platform, and a pitcher-support pivotally secured to the standards, the pivotal points of the support being below and to the rear of the center of gravity of the pitcher when in position, substantially as described.

2. In a washstand, the combination, with a receptacle provided with a cover, of a vertically-movable platform therein connected with the cover, standards on the platform, a wire spring clamp eccentrically pivoted in the top of the standards, and a washbowl adjacent to the receptacle, substantially as described.

3. In a washstand, the combination, with a receptacle provided with a cover, of a vertically-movable platform therein connected with the cover, standards on the platform, a pitcher-support pivotally secured to the standards, said support consisting of a single piece of wire, the ends of which are straight and in line with each other and the central portion is formed into a bow, the center of which is forward of the ends, and the portions of the wire connecting the ends with the ends of the bow each extend rearwardly and upwardly toward the other, and a washbowl, adjacent to the receptacle, substantially as described.

4. The combination, with an article of furniture, provided with a washbowl and a washwater receptacle, of a pitcher-receptacle secured thereto and provided with a lid and a vertically-movable platform, a connector between the lid and the platform, standards on the platform, a pitcher-support pivotally secured to the standards, and a pitcher in the support, the pivotal points of the support being below and to the rear of the center of gravity of the pitcher when in their normal positions, substantially as described.

FRANK G. CASWELL.

Witnesses:
ERNEST JORDAN,
H. J. CLARKE.